United States Patent
Wolflick et al.

(10) Patent No.: US 7,712,299 B2
(45) Date of Patent: May 11, 2010

(54) ANTI-BOGDOWN CONTROL SYSTEM FOR TURBINE/COMPRESSOR SYSTEMS

(75) Inventors: John R. Wolflick, Las Cruces, NM (US); Megan V. Evans, Sugar Land, TX (US); Jaleel Valappil, Houston, TX (US); Bobby D. Martinez, Sugar Land, TX (US); Marc Bellomy, Cypress, TX (US)

(73) Assignee: ConocoPhillips Company, Houston, TX (US)

( * ) Notice: Subject to any disclaimer, the term of this patent is extended or adjusted under 35 U.S.C. 154(b) by 874 days.

(21) Appl. No.: 11/470,010

(22) Filed: Sep. 5, 2006

(65) Prior Publication Data

US 2008/0056910 A1    Mar. 6, 2008

(51) Int. Cl.
*F02G 3/00* (2006.01)

(52) U.S. Cl. ............................ 60/39.091; 60/794

(58) Field of Classification Search ............... 60/39.23, 60/773, 779, 39.091, 794; 417/1, 27, 46; 415/1, 13, 26
See application file for complete search history.

(56) References Cited

U.S. PATENT DOCUMENTS

| | | | |
|---|---|---|---|
| 3,321,930 A | 5/1967 | Fleur | |
| 3,527,059 A | 9/1970 | Rust et al. | |
| 4,349,744 A | 9/1982 | Reuther et al. | |
| 4,423,592 A | 1/1984 | Evans | |
| 4,490,791 A | 12/1984 | Morrison | |
| 4,809,154 A | 2/1989 | Newton | |
| 4,932,220 A | 6/1990 | Inoue | |
| 4,949,276 A * | 8/1990 | Staroselsky et al. | 700/282 |
| 5,306,116 A | 4/1994 | Gunn et al. | |
| 5,609,016 A | 3/1997 | Yamada | |
| 5,752,378 A * | 5/1998 | Mirsky et al. | 60/773 |
| 5,873,257 A | 2/1999 | Peterson | |
| 5,879,133 A * | 3/1999 | Mirsky et al. | 417/46 |
| 5,967,742 A * | 10/1999 | Mirsky et al. | 415/1 |
| 6,230,479 B1 | 5/2001 | Kawamura | |
| 6,317,655 B1 * | 11/2001 | Khots et al. | 700/275 |
| 6,813,875 B2 | 11/2004 | Inoue | |
| 7,069,733 B2 | 7/2006 | Lucas | |
| 7,096,669 B2 | 8/2006 | Narayanan | |
| 7,421,854 B2 * | 9/2008 | Shaffer et al. | 62/500 |
| 7,549,292 B2 * | 6/2009 | Peck et al. | 60/773 |
| 7,594,386 B2 * | 9/2009 | Narayanan et al. | 60/39.24 |
| 2002/0190695 A1 | 12/2002 | Wall et al. | |
| 2005/0160749 A1 | 7/2005 | Shaffer et al. | |

FOREIGN PATENT DOCUMENTS

WO    WO 2005/047789    5/2005

* cited by examiner

*Primary Examiner*—William H Rodriguez

(57) ABSTRACT

An anti-bogdown control system monitors and regulates operation of a turbine and a compressor to prevent underspeed trip of the turbine while avoiding surge of the compressor. A turbine speed controller receives a turbine speed signal and a turbine temperature signal, generates a surge margin setpoint, and regulates overfiring of the turbine. A surge margin controller associated with the compressor receives the surge margin setpoint from the turbine speed controller and receives a load signal from one or more sensors and modulates a compressor throttle valve so that the compressor operates at a surge margin that is approximately equal to the surge margin setpoint. In a system with multiple compressors driven by a single turbine, a surge margin controller is associated with each compressor.

20 Claims, 5 Drawing Sheets

ANTI-BOGDOWN CONTROL SYSTEM FOR TURBINE/COMPRESSOR SYSTEMS

BACKGROUND OF THE INVENTION

1. Field of the Invention

The present invention relates to the field of compressor and turbine control systems. In one aspect, the invention concerns an anti-bogdown system for controlling a turbine/compressor system in a manner that avoids underspeed trip of the turbine and avoids surge of the compressor that is driven by the turbine.

2. Description of Prior Art

Gas turbines are commonly used to drive large compressor systems that are used, for example, in the refrigeration cycles of processes for liquefying natural gas. In order to maximize the efficiency of such turbine/compressor systems, the gas turbines are typically operated at or near their maximum rated speed and load. Various changes in the operating parameters of a turbine/compressor system may cause the turbine to slow down. A partial slowdown in the speed of the turbine tends to precipitate further slowdown until the turbine "bogs down" (i.e., automatically shuts down when it reaches a critically low operating speed).

Several factors can cause a gas turbine to slow down. First, if two compressors are running in parallel, a decrease in the output of a first compressor would increase the load on the second compressor, thereby causing the turbine driving the second compressor to slow down. Second, if a starter/helper motor shuts down, the loss in power provided by the starter/helper motor can result in a sudden increase in the train load and accompanying decrease in turbine speed. Third, the operating conditions of the gas turbine can cause it to slow down when, for example, hot gases from the turbine exhaust are blown into an air intake of the turbine.

The load of centrifugal compressors is determined primarily by the fluid flow rate through the compressor and the fluid pressure increase across the compressor. When the fluid flow rate through the compressor becomes too low, the compressor can enter an operating condition know as "surge." When a compressor enters surge, it is unable to maintain the pressure required at the discharge port. During surge, the direction of fluid flow is reversed as the higher pressure fluid at the discharge flows backward into the compressor.

Surge in centrifugal compressors can be understood to occur at low flow conditions below which the rotating impeller cannot impart sufficient momentum to the fluid to overcome the difference in pressure between the compressor inlet and compressor outlet. During surge, flow through a compressor becomes unstable and momentarily reverses direction—shock loading the compressor, disrupting system operations, and potentially damaging the compressor. Thus, centrifugal compressors that operate over a range of conditions should be protected from inadvertent entry into surge.

In order to avoid surge, compressors are typically operated at a flow rate above the surge flow rate (i.e., the flow rate at which surge is initiated). The difference between the operating flow rate of a compressor and its surge flow rate is known as the "surge margin." Surge margin is generally expressed as a percentage difference between the operating flow rate and the surge flow rate, with the flow rates being expressed on a volumetric basis. For example, if surge flow rate is 10 and operating flow rate is 12, the operating surge margin is 20 percent.

A conventional method of avoiding surge involves recirculating fluid from the compressor outlet to the compressor inlet to decrease the net flow rate through the compressor, a process often referred to as "recycle." The decrease in net flow rate interacts with the process system to limit the difference in pressure between the compressor inlet and compressor outlet. Although surge is avoided by initiating recycle, operating in recycle mode adversely affects the system efficiency and, therefore, the cost of operation.

The approach of a compressor to surge can be monitored by external measurement of flow rate and pressure to determine the compressor's condition relative to surge. Seeking an optimum operating surge margin is desired to avoid both surge and unnecessary inefficiency. Setting the operating surge margin too high can limit the efficiency of the system and result in wasted energy and an unnecessary loss of efficiency during low flow conditions because recycle is unnecessarily or prematurely initiated. Setting the operating surge margin too low can result in the compressor reaching surge and being damaged.

Accordingly, there is a need for an improved compressor/turbine monitoring and control system that does not suffer from the problems and limitations of the prior art.

SUMMARY OF THE INVENTION

One embodiment of the present invention concerns a process for controlling a system employing a gas turbine to drive a first compressor, wherein the first compressor is operable to increase the pressure of a first working fluid. The process comprises the following steps: (a) sensing the rotational speed of the turbine; (b) sensing the load of the first compressor; and (c) adjusting flow of the first working fluid into the first compressor based at least in part on the rotational speed of the turbine and the load of the first compressor.

Another embodiment of the invention concerns a process of controlling a system employing a gas turbine to drive a first compressor. The process comprises the following steps: (a) sensing the rotational speed of the turbine; (b) adjusting at least one operating parameter of the first compressor to thereby reduce the load of the first compressor; and (c) causing overfiring of the turbine to thereby increase the rotational speed of the turbine.

Still another embodiment of the invention concerns an apparatus comprising a gas turbine, a compressor, a speed controller, a load indicator, a throttle valve, and a surge margin controller. The compressor is configured to be driven by the gas turbine. The speed controller generates a surge margin setpoint based on the rotational speed of the gas turbine. The load indicator generates a surge signal based on the load of the compressor. The throttle valve controls fluid flow into the compressor. The surge margin controller modulates the throttle valve based at least in part on the surge margin setpoint and the surge signal.

BRIEF DESCRIPTION OF THE DRAWING FIGURES

Certain embodiments of the present invention are described in detail below with reference to the attached drawing figures, wherein.

DETAILED DESCRIPTION OF THE PREFERRED EMBODIMENT

Figure 1:
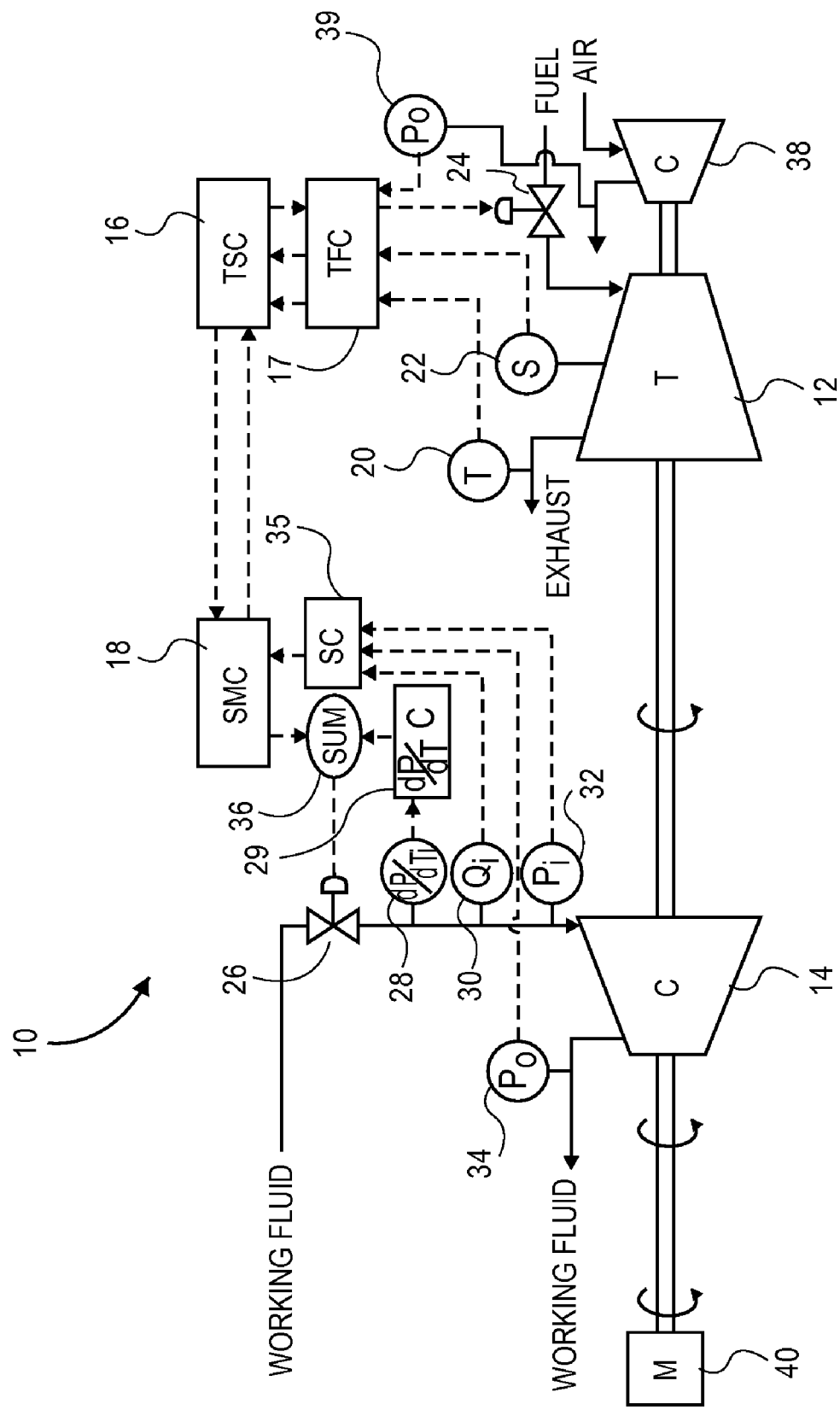
FIG. 1 is a schematic view of a first embodiment of an anti-bogdown control system for a compressor driven by a gas turbine.

An anti-bogdown control system configured in accordance with one embodiment of the present invention is illustrated in FIG. 1 and designated generally by the reference numeral 10. The anti-bogdown control system 10 monitors and regulates operation of a turbine 12 and a compressor 14 to prevent underspeed trip of the turbine 12 while avoiding surge of the compressor 14.

The system 10 broadly includes a turbine speed controller 16, a turbine fuel controller 17, a surge margin controller 18, a turbine temperature sensor 20, a turbine speed sensor 22, a turbine fuel valve 24, a compressor throttle valve 26, a rate of change in pressure (dP/dT) sensor 28, a rate of change of pressure (dP/dT) controller 29, a compressor inlet volume flow sensor 30, a compressor inlet pressure sensor 32, a compressor outlet pressure sensor 34, a compressor surge controller 35, and a summing device 36. An inlet gas compressor 38 and a start-up motor 40 may also be associated with the compressor 14, wherein the inlet gas compressor 38 provides compressed air for combustion in the turbine 12. A turbine air compressor outlet pressure sensor 39 can also be used to provide an input signal to the turbine fuel controller 17.

The turbine fuel controller 17 and turbine speed controller 16 receive a temperature signal from the turbine temperature sensor 20 indicating the temperature of the turbine exhaust gases. The turbine fuel controller 17 and turbine controller 16 also receive a speed signal from the turbine speed sensor 22 indicating the rotational speed of the turbine 12. The turbine speed controller 16 generates a surge margin setpoint based at least in part on the speed signal, and communicates the setpoint to the surge margin controller 18. The turbine fuel controller 17 regulates the flow of fuel into the turbine 12 by modulating the turbine fuel valve 24 based at least in part on the temperature of the turbine exhaust gases.

The surge margin controller 18 regulates operation of the compressor 14 according to the surge margin setpoint received from the turbine speed controller 16 so that the compressor 14 operates at approximately the surge margin setpoint. The surge margin controller 18 determines an operating surge margin by receiving an operating surge margin signal from the surge controller 35. The operating surge margin signal is determined based on one or more of an inlet pressure signal from the inlet pressure sensor 32, an outlet pressure signal from the outlet pressure sensor 34, and a fluid flow signal from the fluid flow sensor 30. If the operating surge margin is greater than the surge margin setpoint received from the turbine speed controller 16, the surge margin controller 18 modulates the throttle valve 26 towards closed to reduce flow through the compressor 14, thereby causing the compressor 14 to operate at a lower surge margin.

The dP/dT sensor 28 generates a signal indicative of changes in the inlet pressure of the compressor 14. The dP/dT sensor 28 is operable to detect rapid fluctuations in the inlet pressure of the compressor 14 that would disrupt operation of the compressor 14 before the turbine speed controller 16 could respond. The dP/dT signal is communicated to the dP/dT controller 29 where it is checked against a pre-determined threshold valve. If the dP/dT signal exceeds the threshold valve, the dP/dT controller 29 sends a signal to a summing element 36. The signal generated by the dP/dT controller 29 is communicated directly to the summing element 36, which can quickly modulate the compressor throttle valve 26. For example, if the dP/dT sensor 28 senses a rapid increase in the inlet pressure of the compressor 14, the signal generated by the dP/dT controller 29 reflects the increase and the summing element 36 modulates the throttle valve 26 towards closed to decrease the amount of fluid flowing into the compressor 14, thereby avoiding a critical increase in the load of the compressor 14.

The summing element 36 modulates the compressor throttle valve 26 according to the signal received from the dP/dT controller 29 and the signal received from the surge margin controller 18. The summing element 36 thus enables both the surge margin controller 18 and the dP/dT controller 29 to modulate the throttle valve 26 to regulate the flow of fluid through the compressor 14. The summing element 36 combines signals received from the dP/dT controller 29 and the surge margin controller 18 in a conventional manner using, for example, digital or analog electrical circuitry. While the summing element 36 has been illustrated and described separately from the surge margin controller 18, it will be appreciated that the summing element 36 may be integral with the surge margin controller 18.

An exemplary implementation of the anti-bogdown control system 10 (FIG. 1) will now be described with reference to the block diagram of FIG. 2. As depicted in blocks 42 and 44 of FIG. 2, the turbine speed sensor 22 senses the speed of the turbine 12 (block 42) and the anti-bogdown system 10 receives a governor setpoint signal from the turbine fuel controller 17 (block 44). As depicted in block 46, the turbine speed signal and the governor setpoint signal are received and processed by the turbine speed controller 16. The turbine speed controller 16 generates a surge margin setpoint that represents a minimum acceptable turbine speed and tracks slightly lower than the governor setpoint.

As depicted in block 48, the turbine speed controller 16 determines whether the speed of the turbine 16 is too low. The controller 16 may determine whether the speed is too low by comparing the actual speed of the turbine 12 with the minimum acceptable turbine speed. The minimum acceptable turbine speed may be, for example, about one-half of one percent less than the governor setpoint speed, about one percent less than the governor setpoint speed, or about two percent less than the governor setpoint speed.

If the turbine speed is too low, the controller 16 determines whether the speed is recovering or stabilized, as depicted in block 50. If the speed is recovering (i.e., increasing), the controller 16 does not adjust the overfiring or the surge margin setpoints, but simply continues sensing turbine speed. The turbine speed is stabilized if the change in the rotational speed of the turbine over time is below a certain level (e.g., less than about one percent over ten seconds).

During normal operation, the governor portion of the turbine fuel controller 17 monitors the turbine speed signal received from the turbine speed sensor 22 and modulates the fuel valve 24 to maintain the turbine speed at the governor setpoint speed. In addition, during normal operation, the temperature control portion of the turbine fuel controller 17 monitors the turbine temperature signal received from the turbine temperature sensor 20, adjusted by the signal received from the turbine air compressor discharge pressure sensor 39 and, if necessary, overrides the governor portion, modulating the fuel valve 24 to prevent the temperature from exceeding a base load level that is consistent with the base load inspection, maintenance, and overhaul schedule for turbine 12.

Turbine overfiring is a condition in which the allowable exhaust temperature of a turbine is modulated between the base load level and a higher peak load level. This allows the turbine to produce more power. The peak load level is consistent with a peak load inspection, maintenance, and overhaul schedule which is more severe than the base load schedule. Therefore, the overfiring is automatically limited in degree to the peak load level. An operator alarm can be activated whenever overfiring is in effect to give the operators the opportunity to simply allow overfiring to continue, modify process conditions to decrease compressor load and thus minimize degree and duration of overfiring, or shut the turbine/compressor train down in an orderly manner.

Figure 2:
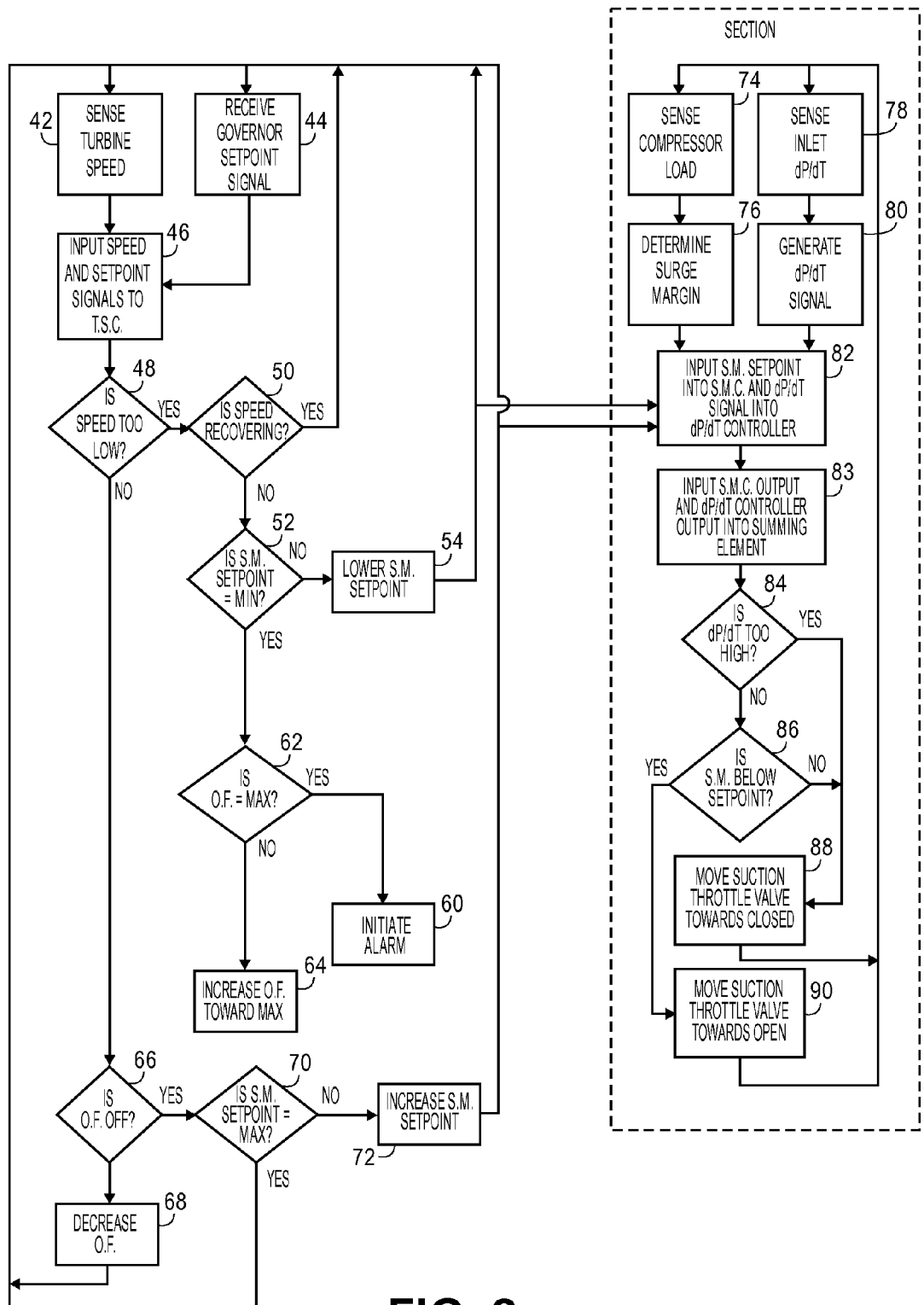
FIG. 2 is a flowchart of steps involved in an exemplary implementation of the control system of FIG. 1.

As depicted in block 52 of FIG. 2, if the speed of the turbine 12 is not recovering, the turbine speed controller 16 determines whether the surge margin setpoint is at the minimum. The minimum surge margin setpoint is slightly higher than the surge controller setpoint. The surge controller setpoint represents an operating condition of the compressor 14 that is as close to surge as is deemed safe. If the compressor 14 operates any closer to surge than the surge controller setpoint, it is considered too close to surge and is corrected by the surge controller 35 opening a compressor recycle valve (not shown). The minimum surge margin setpoint is set slightly higher than the surge controller setpoint to prevent the system from going into recycle under the influence of the anti-bogdown control system 10. For example, the surge controller setpoint can be in the range from eight to eighteen percent surge margin, while the minimum surge margin controller setpoint can be in the range of ten to twenty percent surge margin.

As depicted in block 54, if the surge margin setpoint is not at the minimum, the controller 16 lowers the setpoint. The new setpoint is communicated to the surge margin controller 18 associated with the compressor 14, as explained below. If the surge margin setpoint is at the minimum, the turbine speed controller 16 and/or turbine fuel controller 17 determines whether the overfiring has reached the a maximum overfiring level, as depicted in block 62. If overfiring has reached the maximum overfiring level, an operator alarm is initiated, as depicted in block 60. If the overfiring limit has not been reached, the turbine speed controller 16 and/or turbine fuel controller 17 increases overfiring toward the maximum level, as depicted in block 64.

Returning again to block 48, if the turbine speed controller 16 and/or turbine fuel controller 17 determines that the turbine speed is not too low, it then determines whether turbine overfiring is off, as depicted in block 66. The overfiring may be on, for example, if the system recently recovered from a slowdown that required overfiring to prevent bogdown. If overfiring is not off, overfiring is decreased toward off, as depicted in block 68. If overfiring is off, the turbine speed controller 16 determines whether the surge margin setpoint is at a maximum surge margin set point, as depicted in block 70. Under normal operation, it is desired that the operating surge margin be below the predetermined maximum and that the suction throttle valve 26 be fully open to maximize system throughput and efficiency. Therefore, if the surge margin setpoint is not at the maximum level, the turbine speed controller 16 increases the setpoint, as depicted in block 72.

The steps of the process described thus far are generally performed by the turbine speed controller 16 and/or the fuel controller 17 in response to the speed and the adjusted exhaust temperature of the turbine 12. The portion of the flowchart labeled "section" represents steps of the process that are generally performed by the surge margin controller 18, the dP/dT controller 29, and the summing element 36 in response to the surge margin setpoint generated by the turbine speed controller 16, the operating surge margin calculated by the surge controller 35, and the dP/dT value sensed by dP/dT sensor 28.

Figure 3:
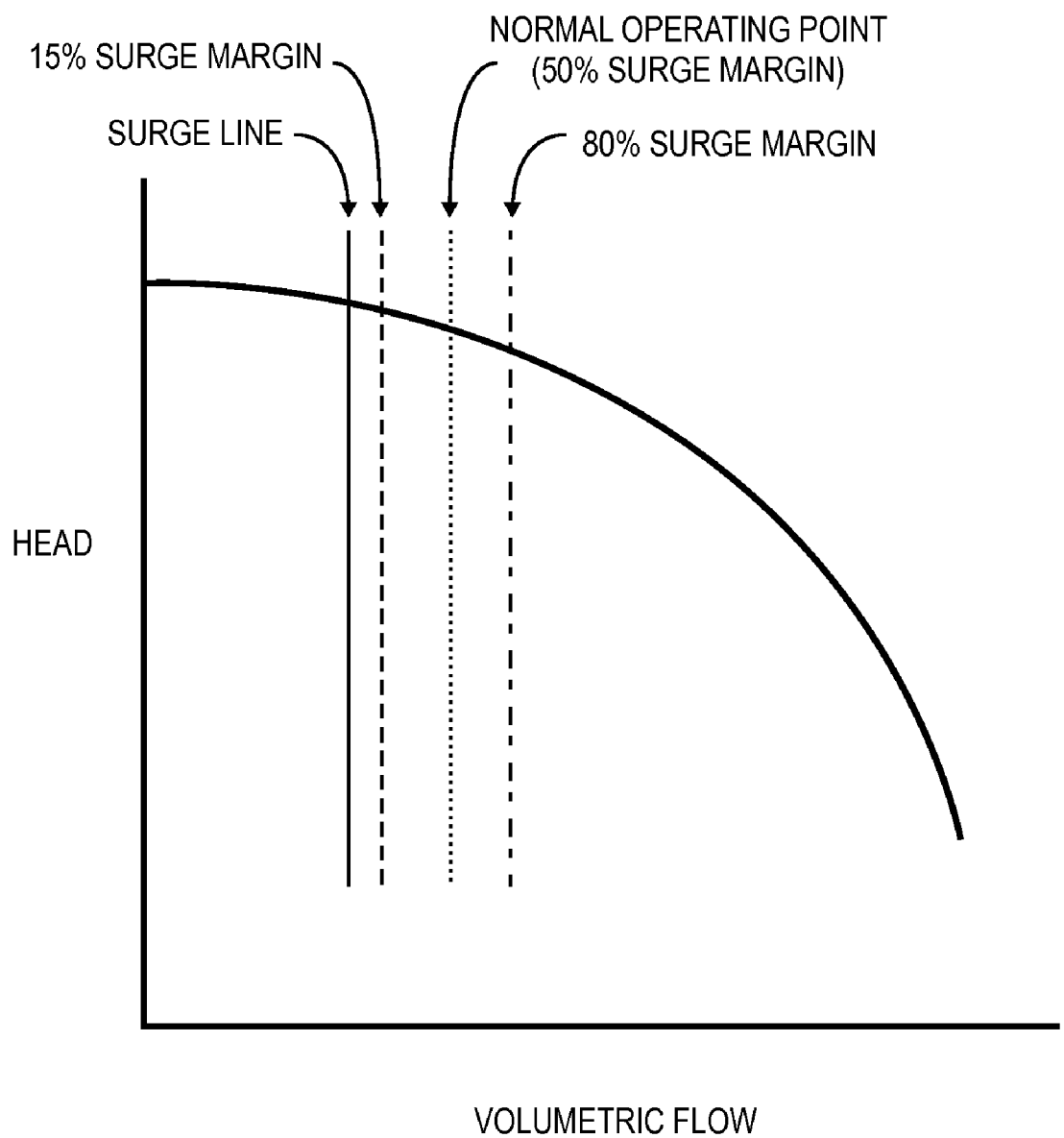
FIG. 3 is a compressor curve showing the surge line (i.e., the volumetric flow rate at which the compressor enters surge) and various operating surge lines/margins.

FIG. 3 provides an exemplary compressor curve and shows possible locations of the surge line, minimum surge margin, normal operating surge margin, and maximum surge margin. The surge margin represents a percentage the operating flow is above surge flow. The surge line represents an operating point where fluid flow rate through a compressor is reduced to an unstable level, as explained above in the section titled "DESCRIPTION OF PRIOR ART." The point at which surge occurs depends on both the volumetric fluid flow through the compressor and the "head," or difference between the compressor inlet pressure and compressor outlet pressure. As illustrated in FIG. 3, a normal operating point may be, for example, at a fifty percent surge margin. An exemplary minimum surge margin is fifteen percent. An exemplary maximum surge margin is eighty percent.

As depicted in block 74 of FIG. 2, the load on the compressor 14 is sensed via one or more of the sensors 30,32,34 (i.e., load sensors) which communicate with the surge controller 35. The surge controller 35 then determines an operating surge margin, as depicted in block 76.

As depicted in block 78, the dP/dT sensor 28 senses an inlet change in pressure with respect to time, referred to as dP/dT. This may be accomplished, for example, by using a conventional pressure transducer and a timing circuit for comparing a change in pressure with a time over which the change occurred. As depicted in block 80, the dP/dT sensor 28 generates a dP/dT signal indicative of rate of change in the pressure of the working fluid entering the compressor 14.

As depicted in block 82, once the operating surge margin and dP/dT signal have been determined, the operating surge margin signal (from the surge controller 35) and surge margin setpoint (from the turbine speed controller 16) are inputted into the surge margin controller 18, while the dP/dT signal (from the dP/dT sensor 28) is inputted into the dP/dT controller 29. In the surge margin controller 18, the operating surge margin is compared to the surge margin setpoint and the dP/dT signal is compared to a pre-determined threshold dP/dT value. As depicted in block 83, the surge margin controller 18 generates a surge margin control signal that is inputted into the summing element 36, while the dP/dT controller generates a dP/dT control signal that is inputted into the summing element.

As depicted in blocks 84-90, if either the dP/dT is too high (block 84) or the operating surge margin of the compressor 14 is not below the surge margin setpoint (block 86), the summing element 36 moves the suction throttle valve 26 toward closed (block 88). If the dP/dT is not too high (block 84) and the operating surge margin of the compressor 14 is below the surge margin setpoint (block 86), the summing element 36 moves the suction throttle valve 26 toward open (block 90).

Figure 4:
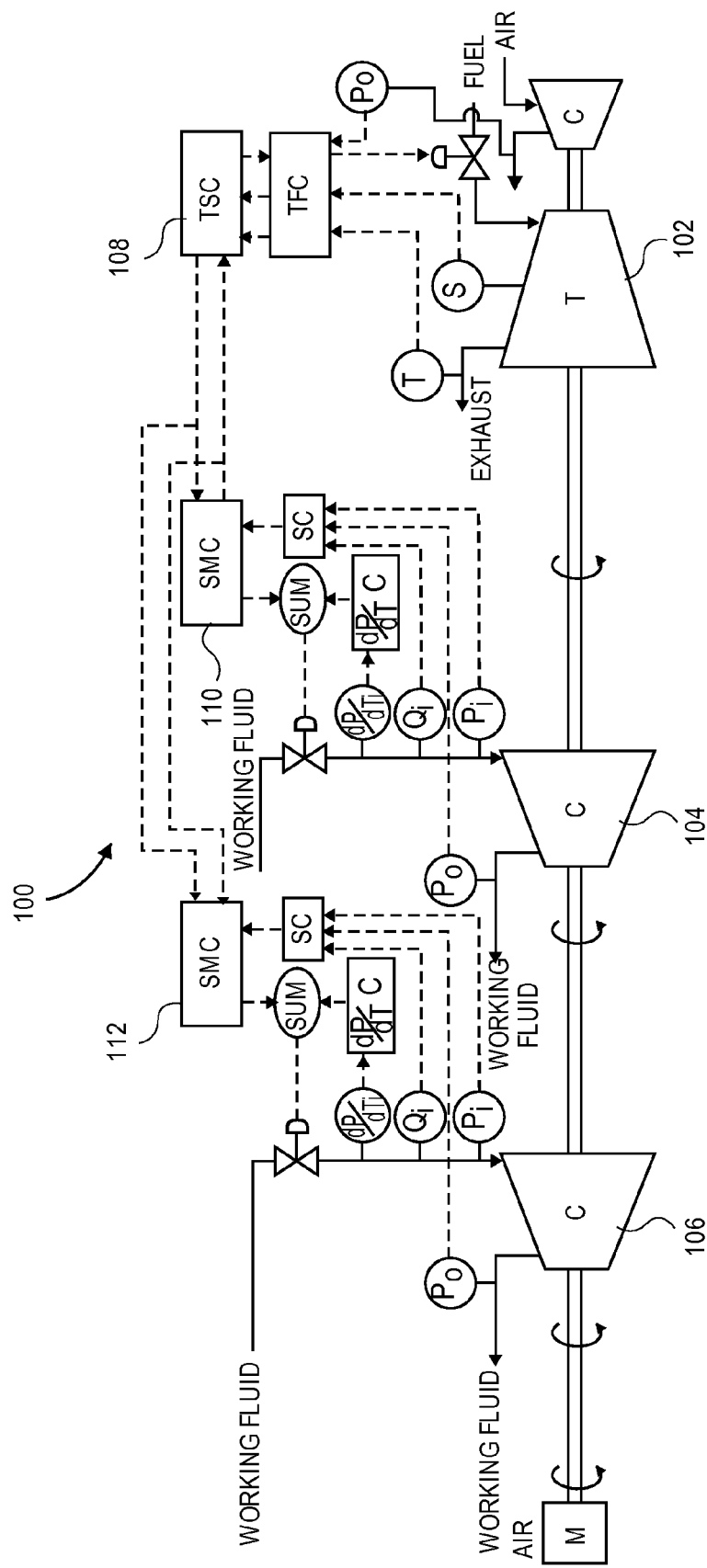
FIG. 4 is a schematic view of an anti-bogdown control system constructed in accordance with a second embodiment of the present invention and including a compressor train with two compressors driven by a single turbine.

A second embodiment of an anti-bogdown control system incorporating principles of the present invention is illustrated in FIG. 4 and designated generally by the reference numeral 100. Certain aspects of the system 100 are substantially similar to the system 10. The system 100 includes a turbine 102, two compressors 104 and 106, and a turbine speed controller 108. It will be appreciated that the system 100 may include a plurality of compressors that form part of a single compressor train. The various compressors 104,106 of the system 100 are each associated with a "section," such that the system 100 includes two sections. Each section includes a compressor 104,106, associated surge margin controllers 110,112, and various sensors as described above in relation to the single compressor anti-bogdown control system 10 of FIG. 1.

Each surge margin controller 110,112 receives the surge margin setpoint from the turbine speed controller 108 and regulates operation of the respective compressor 104,106 according to the surge margin setpoint received from the turbine speed controller 108 so that the respective compressor 104,106 operates at approximately the surge margin setpoint. Including a surge margin controller 110,112 in each compressor section is advantageous because the operating parameters associated with each compressor 104,106 typically are not identical. The inlet pressure, outlet pressure, and volumetric flow may be different for each compressor 104,106, for example, such that each surge margin controller 110,112 will need to uniquely modulate the volumetric flow through each compressor 104,106 to maintain optimal operation.

Figure 5:
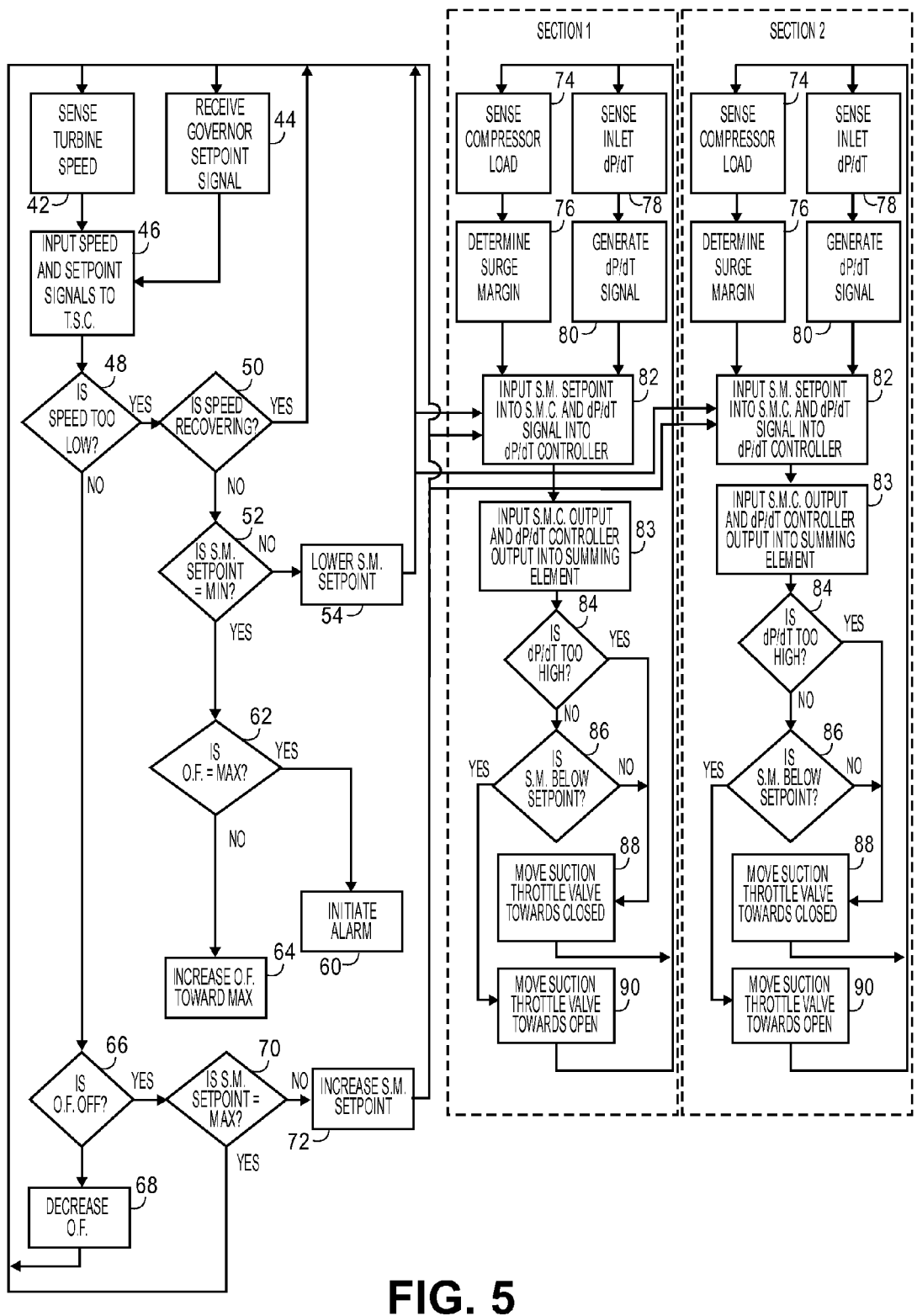
FIG. 5 is a flowchart of steps involved in an exemplary implementation of the control system of FIG. 4.

FIG. 5 illustrates a flowchart of steps involved in the operation of the system 100. The flowchart of FIG. 5 is similar to the flowchart of FIG. 2, except that the flowchart of FIG. 5 includes surge margin controller process steps for the first surge margin controller 110 and the second surge margin controller 112, wherein the first and second surge margin controllers 110,112 operate independently of each other.

In one embodiment of the present invention, the anti-bogdown control system described and illustrated herein is employed to control turbine-driven compressors used to compress one or more refrigerant streams. For example, the turbine-driven compressors described herein can be used to compress refrigerants employed as part of a mechanical refrigeration cycle used to cool natural gas in a liquefied natural gas (LNG) plant. Generally, refrigerants employed in LNG plants include, for example, propane, propylene, ethane, ethylene, methane as pure component refrigerants or in various combinations as mixed refrigerants. When a single turbine is used to drive more than one compressor (e.g., FIG. 4), each compressor can be used to compress a different refrigerant composition.

Having thus described a preferred embodiment of the invention, what is claimed as new and desired to be protected by Letters Patent includes the following:

What is claimed is:

1. A process for controlling a system employing a gas turbine to drive a first compressor, wherein said first compressor is operable to increase the pressure of a first working fluid, said process comprising:
   (a) sensing the rotational speed of said turbine;
   (b) sensing the load of said first compressor;
   (c) adjusting flow of said first working fluid into said first compressor based at least in part on the rotational speed of said turbine and the load of said first compressor; and
   (d) initiating overfiring of said turbine based at least in part on the rotational speed of said turbine, wherein said overfiring is initiated when the rotational speed of said turbine falls below a minimum acceptable turbine speed and said adjusting of step (c) is ineffective to increase the rotational speed of said turbine back to said minimum acceptable turbine speed.

2. The process of claim 1, wherein step (c) includes modulating a first throttle valve that controls flow of said first working fluid into said first compressor.

3. The process of claim 1, wherein step (b) includes calculating the surge margin of said first compressor and/or sensing the rate of change in pressure of said first working fluid.

4. The process of claim 1, further comprising:
   (e) terminating said overfiring when the speed of said turbine is increased to said minimum acceptable turbine speed.

5. The process of claim 1, further comprising:
   (f) sensing the rate of change in pressure of said first working fluid entering said first compressor, wherein said adjusting of step (c) is based at least in part on the rate of change in pressure of said first working fluid entering said first compressor.

6. The process of claim 1, further comprising:
   (g) determining a surge margin setpoint based at least in part on the rotational speed of said turbine.

7. The process of claim 6, wherein step (g) includes comparing the rotational speed of said turbine to a minimum acceptable turbine speed.

8. The process of claim 7, wherein step (g) includes increasing said surge margin setpoint when the rotational speed of said turbine at or above said minimum acceptable turbine speed and said surge margin setpoint is below a maximum surge margin setpoint.

9. The process of claim 7, wherein step (g) includes determining whether the rotational speed of said turbine is increasing over time.

10. The process of claim 7, wherein step (g) includes lowering said surge margin setpoint when the rotational speed of said turbine is below said minimum acceptable turbine speed, said rotational speed of said turbine is not increasing over time, and said surge margin setpoint is not below a minimum surge margin setpoint.

11. The process of claim 6, further comprising:
   (h) determining the operating surge margin of said first compressor; and
   (i) comparing the operating surge margin of said first compressor to said surge margin setpoint.

12. The process of claim 11, wherein step (c) includes increasing the flow of said first working fluid into said first compressor when said operating surge margin is less than said surge margin setpoint or decreasing the flow of said first working fluid into said first compressor when said operating surge margin is greater than said surge margin setpoint.

13. The process of claim 1, wherein said system includes a second compressor driven by said turbine and operable to increase the pressure of a second working fluid.

14. The process of claim 13, further comprising:
   (j) sensing the load of said second compressor; and
   (k) adjusting flow of said second working fluid into said second compressor based at least in part on the rotational speed of said turbine and the load of said second compressor.

15. The process of claim 13, wherein the first working fluid is a first refrigerant and the second working fluid is a second refrigerant different than the first refrigerant.

16. The process of claim 1, wherein said first compressor is part of a refrigeration cycle used to cool natural gas.

17. An apparatus comprising:
   a gas turbine;
   a first compressor configured to be driven by said gas turbine;
   a speed controller for generating a surge margin setpoint based on the rotational speed of said gas turbine;
   a first load indicator for generating a first surge signal based on the load of said first compressor;
   a first throttle valve for controlling fluid flow into said first compressor; and a first surge margin controller for modulating said first throttle valve based at least in part on said surge margin setpoint and said first surge signal.

18. The apparatus of claim 17, further comprising a pressure sensor for generating a rate of change of pressure signal indicative of the rate of change of the pressure at the inlet of said first compressor and a rate of change of pressure controller for controlling the rate of change of pressure at the inlet of said first compressor.

19. The apparatus of claim 18, wherein said rate of change of pressure controller is operable to modulate said first throttle valve based at least in part on said rate of change of pressure signal.

20. The apparatus of claim 17, further comprising a second compressor configured to be driven by said gas turbine; a second load indicator for generating a second surge signal based at least in part on the load of said second compressor; a second throttle valve for controlling fluid flow into said second compressor; and a second surge margin controller for modulating said second throttle valve based at least in part on said surge margin setpoint and second surge signal.

* * * * *